United States Patent [19]

Lee

[11] 4,094,382

[45] June 13, 1978

[54] LUBRICANT FEED SYSTEM

[75] Inventor: Arthur Lee, North Vancouver, Canada

[73] Assignee: Trail Manufacturing Ltd., Trail, Canada

[21] Appl. No.: 699,001

[22] Filed: Jun. 21, 1976

[51] Int. Cl.[2] .................. F16N 13/08

[52] U.S. Cl. .................. 184/15 R; 184/28; 123/196 CP; 30/123.4

[58] Field of Search .................. 184/15 R, 15 A, 15 B, 184/16, 28; 30/123.4, 381; 123/196 CP; 83/169

[56] References Cited

U.S. PATENT DOCUMENTS

| | | | |
|---|---|---|---|
| 2,852,096 | 9/1958 | Armstrong | 184/15 R |
| 2,883,000 | 4/1959 | Mattson | 184/15 R |
| 3,010,538 | 11/1961 | Strunk | 184/15 R |
| 3,776,369 | 12/1973 | Schrack et al. | 184/15 R |
| 3,844,380 | 10/1974 | Batson | 184/15 R |
| 3,865,213 | 2/1975 | McDermott | 123/196 CP |

*Primary Examiner*—David H. Brown
*Attorney, Agent, or Firm*—Townsend and Townsend

[57] ABSTRACT

A lubricant feed system for use in lubricating the cutting attachments of a chain saw having an internal combustion engine and a lubricant tank. The feed system has a system of passageways permitting flow of lubricant from the tank to the guide bar. A check valve and a manually operable plunger are positioned in the passageway and spaced from each other to define a first chamber. The check valve permits flow from the tank to the bar pad and is openable by pressure in the tank. A metering valve for regulating the flow from the check valve to the bar pad is reciprocable between a closed and an opened position. The reciprocation and thus the position of the valve are controllable by manually operable means extending from the metering valve to the exterior. The metering valve has means to urge it to the closed position. The urging means exerts a force that can be overcome by operation of the plunger. There are means to permit the metering valve to move to a fully open position by the operation of the plunger regardless of the position of the metering valve. Thus operation of the plunger closes the check valve, opens fully the metering valve and forces lubricant contained in the first chamber through the system of passageways to clear any obstruction in said passageways.

5 Claims, 4 Drawing Figures

Fig. 1.
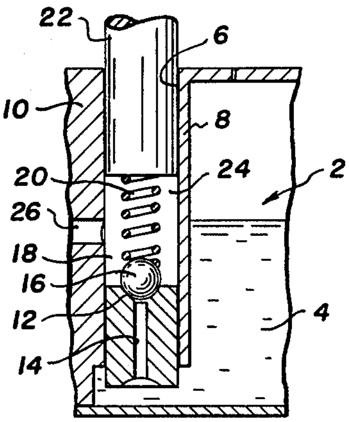
Fig. 2.
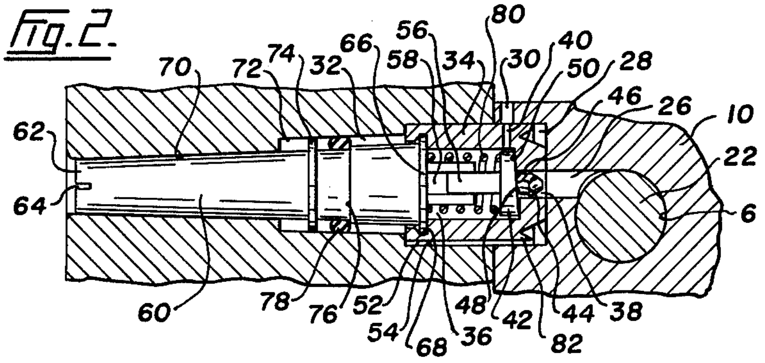
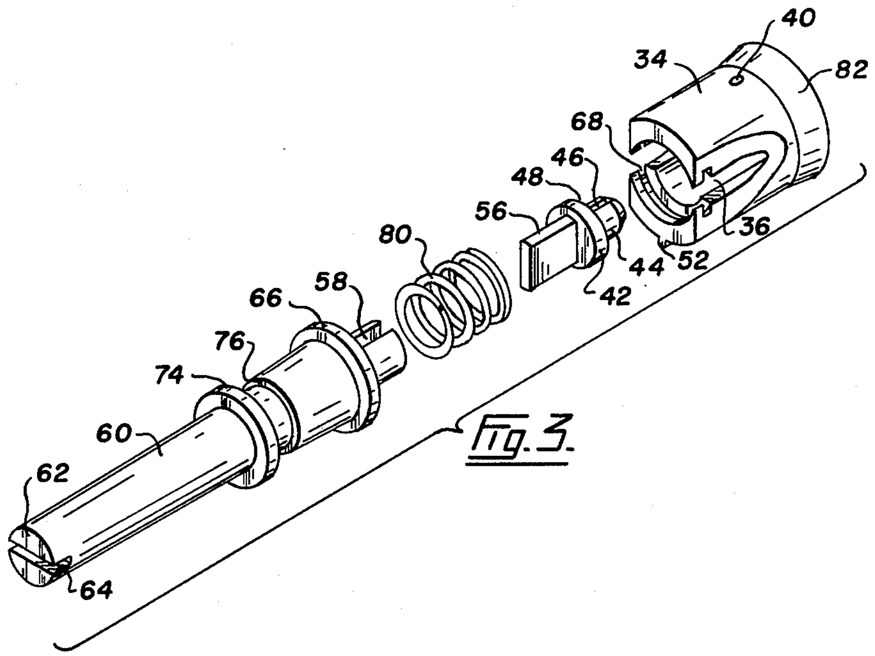
Fig. 3.

LUBRICANT FEED SYSTEM

FIELD OF THE INVENTION

This invention relates to a lubricant feed system for use in lubricating the cutting attachments, and in particular the guide bar and saw chain, of a chain saw having an internal combustion engine and a lubricant tank.

DESCRIPTION OF THE PRIOR ART

Chain saws find a wide variety of applications in cutting wood. Because of the high speed at which they operate it is necessary that the cutting attachments (guide bar and saw chain) of the saw be lubricated constantly. Normally this is done by having a lubricant supplied to the guide bar upon which the chain runs. A number of prior art systems for lubricating the cutting attachments are known. Generally speaking, the lubricant is fed from a tank that is put under pressure by being communicated with the crank case of the internal combustion engine used to operate the saw.

It is known to have an adjustable control in the form of a metering valve in the lubricant supply system for a chain saw. The metering valve can be adjusted and the amount of oil fed to the chain bar pad is thus regulated.

It is also fairly common to have a purging system fitted on a chain saw whereby a supply of lubricant at relatively high pressure can be forced through the system. Obviously, the saw is used in conditions that are extremely dusty. For example, there are large amounts of sawdust produced in the use of a chain saw. This dust tends to clog the guide bars and, what is more of a disadvantage, can block the lubricant passageways thus restricting or completely preventing the supply of lubricant to the blade. The purge system thus permits a supply of high pressure lubricant to be fed through the lubricant passageways to force the sawdust or the like out of the passageways.

A disadvantage of the prior art systems is that the metering valve, once set, still restricts the amount of high pressure lubricant that is fed by the purge system. This disadvantage can be overcome by fully opening the metering valve before applying the purge but this is not always desirable. A more desirable system would be to have an automatic opening of the metering valve upon operation of the purge system. By this means, one simple operation would be sufficient to provide the maximum amount of purge lubricant when required and only by operation of the purge system. That is it would not be necessary to alter the position of the metering valve. Furthermore, such a system should be such that the automatic metering valve would return to its set position after operation of the purge.

SUMMARY OF THE INVENTION

The present invention provides such a lubricant feed system and, according to one aspect is a lubricant feed system for use in lubricating the cutting attachments of a chain saw having an internal combustion engine and a lubricant tank, the feed system comprising a system of passageways permitting flow of lubricant from the tank to the guide bar, a check valve and a manually operable plunger positioned in the passageways, adjacent the tank, and spaced from each other to define a first chamber, the check valve permitting flow from the tank to the cutting apparatus and being openable by pressure in the tank, a metering valve for regulating the flow from the check valve to the cutting apparatus and reciprocable between a closed and an opened position, the reciprocation and thus the position of the valve being controllable by manually operable means extending from the metering valve to the exterior, the metering valve having means to urge it to the closed position but such urging means exerting a force that can be overcome by operation of the plunger, and means to permit the metering valve to move to a fully open position by operation of the plunger, regardless of the position of the metering valve, whereby operation of the plunger closes the check valve, opens fully the metering valve and forces lubricant contained in the first chamber through the system of passageways to clear any obstruction in said passageways.

BRIEF DESCRIPTION OF THE DRAWINGS

A preferred embodiment of the invention is illustrated in the accompanying drawings in which:

FIG. 1 illustrates a plunger and check valve useful in the system of the present invention;

FIG. 2 is a section through a metering valve useful in the system of the present invention;

FIG. 3 is an exploded detail of the metering valve illustrated in FIG. 2; and

DESCRIPTION OF THE PREFERRED EMBODIMENTS

Figure 4:
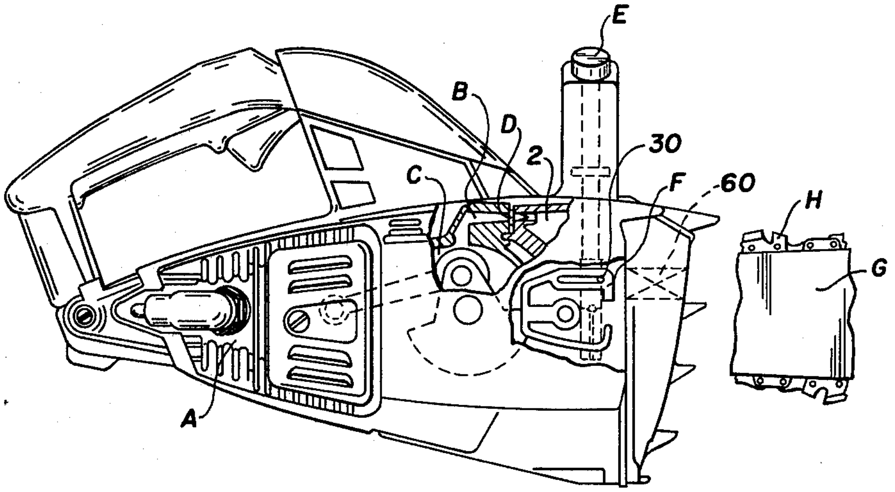
FIG. 4 illustrates a chain saw having the system of the invention.

Referring to the drawings, a preferred lubricant system according to the present invention for use in lubricating the cutting attachments of a chain saw having an internal combustion engine A (FIG. 4) and a lubricant tank 2 containing a supply of lubricant 4 comprises, means in the form of passageway B (FIG. 4) establishing contact between the crank case cavity C of the combustion engine A and the lubricant tank 2 to put the tank 2 at greater than atmospheric pressure when the engine A is running. There is a check valve D in the passageway B. A first passageway 6 defined by an internal wall 8 in the lubricant tank 2 and the wall 10 of the lubricant tank 2 communicates the interior of the lubricant tank with a manually depressible plunger head E at the exterior of the tank 2. In the first passageway 6 there is a check valve comprising a seat member 12 formed with an internal passage 14 closable by a ball 16. The ball 16 is urged into a widened end 18 of the channel 16 by a coil spring 20. The coil spring 20 is of such strength that its urging of the ball 16 to the closed position (as shown in FIG. 1) can be overcome by the exertion of the greater than atmospheric pressure applied to the tank 2 by the crank case pressure of the internal combustion engine. There is a plunger 22 that extends from plunger head E and is an oil tight fit within the first passageway 6. As shown in FIG. 1, the plunger 22 extends from within the first passageway 6 to the plunger head E at the exterior of the lubricant tank 2 so that head E may be depressed by the operator of the chain saw. The depression of the head E and thus the plunger 22 by the operator has the effect of seating the ball 16 in the widened end 18 of the channel 14 and thus closing the check valve.

There is a first chamber 24 defined between the base of the plunger 22 and the seat member 12 of the check valve. A second passageway 26 communicates with the first chamber 24. The second passageway 26 also communicates with a second chamber 28 formed in the wall 10 of the tank 2. A third passageway 30 communicates the second chamber 28 with the bar pad F of the chain saw shown in FIG. 4. The bar pad F acts as a mounting for a guide bar G that carries a saw chain H. The mounting is not shown in FIG. 4 in the interest of clarity but is conventional in the art.

A fourth passageway 32 communicates the second chamber 28 with the exterior of the tank 2. There is a valve body 34 within the second chamber 28. The valve body 34 is hollow and defines a third chamber 36. The valve body 34 has an inlet 38 that communicates the second passageway with the third chamber 36 formed in the interior of the valve 34. The valve 34 is also provided with an outlet 40 that communicates the third chamber 36 with the third passageway 30.

Thus, the flow direction of lubricant in the system is from the tank 2 into the channel 14, to the first chamber 24, to the second passageway 26, through the inlet 38 into the third chamber 36 formed in the valve 34. The lubricant leaves the third chamber 36 through the outlet 40, into the third passageway 30 to the bar pad F of the chain saw and thence to the cutting attachments.

A rotatable valve head 42 is positioned within the third chamber 36. The valve head 42 is formed with a projection 44 that is dimensioned to be a close, oil tight fit within the inlet 38 in the valve 34. There is a slot 46 formed in the projection 44. The valve head 42 is provided with means enabling its reciprocation. In the illustrated embodiment, the means comprises the formation of an inclined face 48 on the valve head 42. A correspondingly inclined wall 50 is formed in the third chamber 36, around the inlet 38. In FIG. 2, the valve is shown in the closed position, that is, the projection 44 is wholly within the inlet 38. Thus, the slot 46 on the projection 44 is wholly within the inlet 38 and lubricant cannot pass through the system. However, by rotation of the valve head 42 relative to the third chamber 36, the relative positions of the sloped faces 48 and 50 changes. As the valve head 42 rotates the valve 34 is retained in its fixed position by a lug 52 formed on the exterior surface of the valve 34 engaging in a slot 54 in the base of the second chamber 28. The valve head 42 is rotated by being formed with a stem 56 that engages in a slot 58 formed on one end of a spindle 60 shown in FIGS. 2 and 3 and whose relative position is shown diagrammatically in FIG. 4. The spindle 60 extends from the valve 34 to the exterior of the tank 2. At the end 62 remote from the tank 2 the spindle 60 is provided with a slot 64 which may be engaged, for example, by a screw driver. Adjacent its interior end the spindle 60 is provided with a flange 66 that engages within a slot 68 within the valve head 45. This locates the spindle 60 within a fifth passageway 70 which communicates the second chamber 28 with the exterior of the tank. Passageway 70 is provided with a wide portion 72. The spindle 60 is provided with a second flange 74 and with a shoulder 76 so that an oil seal 78 may be retained on the spindle 60 to prevent leakage of oil through the passageway 70.

The valve head 42 is urged to the closed position, that is the position in which the projection 44 is wholly with the inlet 38, by a spring 80.

The valve head 34 is also provided with a forwardly projecting collar 82. Valve head 34 is made of a resilient material, for example of an oil resistant synthetic resin, so that when the valve head 34 is positioned within the second chamber 28 collar 82 is compressed inwardly by the interior of the second chamber 28 from the position shown before the collar 82 in FIG. 3 to the position shown in FIG. 2.

The system according to the present invention functions as follows. When the engine A of the chain saw is started, the lubricant tank 2 is placed under pressure by its communication with the crank case cavity C of the engine A via passageway B. That pressure is sufficient to lift the ball 16 off the valve seat member 12 and lubricant 4 can then pass through the passageways to he bar pad F for the cutting attachments once the valve head 42 is moved outwardly from the position shown in FIG. 2 by rotation of the spindle 60. The desired position is chosen by the operator who ensures that adequate lubrication of the cutting attachments takes place. Obviously adjustment of the amount of oil fed is extremely simple and merely involves the rotation of the spindle 60 by, for example, a screw driver in the slot 64. It will be noted that the system is such that the valve can move from a completely closed position as illustrated in FIG. 2 to the fully open metering position by rotating the spindle through 180°.

It should be noted that the operation of the system fills the first chamber 24 between the base of the plunger 22 and the valve seat 12 with lubricant. In normal operation the lubricant passes from this chamber into the second passageway 26 and on through the system of passageways to the bar pad F.

If the operator observes that the system has become blocked or if the guide bar is unduly clogged he simpley depresses the plunger 22 by pressing head E. Depression of the plunger 22 forces the ball 16 onto the valve seat 12 and forces the amount of lubricant within the first chamber 24 at considerable pressure through passageway 26. Spring 80, which in normal operation urges the valve head 42 away from the spindle 60, is of such a strength that its urging is overcome by the pressure applied by the plunger 22. Thus, the valve head 42 and, in particular, the projection 44 on the valve head 42 is moved backwardly so that the projection 44 completely leaves the inlet 38 in the valve 34. Thus, the inlet 38 is completely open and there is no obstruction to the flow of high pressure, purge oil through the system. Any sawdust or the like obstructing the passageways can be pushed out of the passageways by the high pressure purge oil. Upon release of th plunger 22 the ball 16 is moved off the valve seat 12 by pressure built up in the oil tank by crankcase pressure and the chamber 24 is again filled with lubricant 4. If necessary, the plunger may be immediately depressed, for example, if the operator does not believe that the first depression properly cleared the passageways. Upon release of the plunger 22 spring 80 urges the valve head 42 back into the originally set position. It should be noted that the slot 58 acts as a guide for the stem 56 of the valve 42 so that the relative positions of the inclined face 48 and the inclined wall 50 is maintained. Normal operation of the lubricant system therefore resumes upon release of the plunger 22.

From the above it can be noted that the present invention provides a lubricant system that permits a controllable, metered flow of oil to the bar pad of a chain saw during normal operation. But the system can be purged thoroughly without the position of the metering valve for normal operation affecting the purging operation by restricting the passageways.

I claim:

1. A lubricant feed system for use in providing a normal lubrication oil flow and a purging oil flow to cutting attachments of a chain saw having an internal combustion engine with a crankcase, a lubricant tank, means communicating the crankcase and the lubricant tank to put the lubricant tank at crankcase pressure when the engine is running, a bar pad and a guide bar for the chain, the feed system comprising:

a first passageway communicating the interior and the exterior of the lubricant tank;

a check valve in the first passageway permitting lubricant oil to flow out of the lubricant tank and openable by the pressure within the lubricant tank;

a plunger in the first passageway spaced from the check valve and extending to the exterior of the lubricant tank for manual depression;

a chamber defined in the first passageway between the check valve and the plunger;

a second passageway communicating the chamber with the bar pad of the chain saw;

the plunger being manually movable towards the check valve to close the valve and increase the pressure in the chamber and the second passageway to a purging pressure to purge the second passageway;

a metering valve in the second passageway to regulate the normal lubrication oil flow from the chamber to the bar pad under the influence of the pressure in the lubricant tank;

manually operable control means for the metering valve linked to the metering valve by a link and extending to the exterior of the chain saw to permit manual movement of the metering valve to a predetermined position ranging from a closed position to an open position to regulate normal lubrication oil flow;

resilient means urging the metering valve to the predetermined position against the normal lubrication oil flow under the influence of the pressure in the lubricant tank;

the link between the control means and the metering valve co-acting with the resilient means to maintain the metering valve in the predetermined position under normal lubrication oil flow at lubricant tank pressure but permitting (a) the metering valve to move from the predetermined position to a fully open position upon application of purging pressure to the chamber, to the second passageway and to the metering valve by the plunger and (b) the metering valve to return to the predetermined position upon cessation of the purging pressure.

2. A lubricant feed system as claimed in claim 1 in which the metering valve comprises a valve housing located within the second passageway and having an inlet and an outlet each alignable with the second passageway to permit the passage of oil through the housing;

a valve member positioned within the valve housing and reciprocable by the manually operable control means to control normal lubricating oil flow through the inlet.

3. A lubricant feed system as claimed in claim 2 in which the valve housing has an inclined surface on its interior, surrounding the inlet;

an externally slotted projection on the valve member, the projection extending into the inlet;

means to prevent the housing turning relative to the passageway;

an inclined surface on the valve member corresponding to the inclined surface on the valve housing whereby rotation of the valve member causes reciprocation of the valve member as the inclined surfaces change their relative position causing the slot in the valve member to move to a predetermined position from a closed position in which the slot is wholly within the housing inlet to an open position in which at least part of the slot is in the valve housing.

4. A lubricant feed system as claimed in claim 3 in which the manually operable control means for the valve member is a spindle extending outwardly to permit manual rotation of the valve member and in which the link is provided by a recess formed in the spindle, adjacent the valve member, and a stem formed in the valve member and dimensioned to be a close, longitudinally slidable fit in the recess formed in the spindle, the link permitting outward movement of the valve member to the fully open position under the influence of purging pressure applied by the plunger and against the urging applied by the resilient means urging the valve member towards the predetermined position.

5. A lubricant feed system for use in providing a normal lubrication oil flow and a purging oil flow to cutting attachments of a chain saw having an internal combustion engine with a crankcase, a lubricant tank, means communicating the crankcase and the lubricant tank to put the lubricant tank at crankcase pressure when the engine is running, a bar pad and a guide bar, the feed system comprising:

a first passageway communicating the interior of the lubricant tank with the exterior of the tank;

a check valve in the first passageway permitting lubricant to flow out of the tank and openable by pressure within the lubricant tank;

a plunger in the first passageway, spaced from the check valve, and communicating with the exterior of the lubricant tank to permit manual depression of the plunger;

resilient means in the first passageway urging the check valve to the closed position and co-acting between the plunger and the check valve whereby depression of the plunger closes the check valve;

a first chamber defined between the check valve and the plunger, the pressure in said chamber being increased from the normal lubrication oil flow pressure to a purging oil flow pressure by manual depression of the plunger;

a second passageway communicating with the first chamber;

a second chamber communicating with the second passageway;

a third passageway communicating the second chamber with the bar pad of the chain saw;

a fourth passageway communicating with the second chamber and the exterior of the tank;

a valve body positioned in the second chamber and having an interior defining a third chamber;

an inlet in the valve body communicating the second passageway with the third chamber;

an outlet in the valve body communicating the third chamber with the third passageway;

a rotatable valve head positioned within the third chamber and formed with a projection dimensioned to be a close fit within the inlet in the valve body;

a slot formed on the projection;

means enabling reciprocation of the valve head, and thus of the slot, between a position in which lubricant can flow through the inlet and along the slot from the second passageway to the third chamber and a position in which lubricant cannot flow;

resilient means urging the valve head towards the inlet;

whereby pressure applied by the depression of the plunger moves the valve head to a fully open position regardless of the position determined by the means enabling reciprocation of the valve head.

* * * * *